(12) United States Patent
Murakami et al.

(10) Patent No.: US 9,818,241 B2
(45) Date of Patent: Nov. 14, 2017

(54) MALFUNCTION DIAGNOSING APPARATUS FOR VEHICLE

(75) Inventors: Yoshifumi Murakami, Obu (JP); Toshifumi Hayami, Kariya (JP)

(73) Assignee: DENSO CORPORATION, Kariya (JP)

( * ) Notice: Subject to any disclaimer, the term of this patent is extended or adjusted under 35 U.S.C. 154(b) by 1237 days.

(21) Appl. No.: 13/191,823

(22) Filed: Jul. 27, 2011

(65) Prior Publication Data

US 2012/0029760 A1    Feb. 2, 2012

(30) Foreign Application Priority Data

Jul. 30, 2010 (JP) .................................. 2010-171600

(51) Int. Cl.
*B60W 10/06* (2006.01)
*G07C 5/08* (2006.01)

(52) U.S. Cl.
CPC ........... *G07C 5/0808* (2013.01); *B60W 10/06* (2013.01); *B60W 2540/10* (2013.01); *B60W 2710/0605* (2013.01)

(58) Field of Classification Search
CPC . G07C 5/0808; B60W 10/06; B60W 2540/10; B60W 2710/0605
USPC ......................... 701/29.2, 30.2, 30.5, 45, 103
See application file for complete search history.

(56) References Cited

U.S. PATENT DOCUMENTS

| 4,987,872 A | 1/1991 | Geselle et al. |
| 6,881,174 B2 | 4/2005 | McCall |
| 2001/0024159 A1* | 9/2001 | Faye .............................. 340/479 |
| 2011/0264354 A1* | 10/2011 | Debs et al. .................... 701/103 |

FOREIGN PATENT DOCUMENTS

JP    2005-291030    10/2005

OTHER PUBLICATIONS

FindLaw.com, What is a Brake Override System; http://blogs.findlaw.com/injured/2010/03/what-is-a-brake-override-system.html#trackbacks.*

* cited by examiner

*Primary Examiner* — Thomas Ingram
(74) *Attorney, Agent, or Firm* — Nixon & Vanderhye PC

(57) ABSTRACT

An output limiting control is carried out for limiting an output of a driving source when an acceleration pedal as well as a brake pedal is operated at the same time. An acceleration opening degree for a malfunction diagnosis is set based on a detected acceleration opening degree. A required output value for the malfunction diagnosis is calculated based on the acceleration opening degree for the malfunction diagnosis. A malfunction determining threshold is set in accordance with the required output value. An estimated output value of the driving source is compared with the malfunction determining threshold in order to determine whether there is a malfunction in a control system for the driving source. The acceleration opening degree for the malfunction diagnosis is limited to a predetermined limiting value, when the acceleration and brake pedal are operated at the same time.

6 Claims, 11 Drawing Sheets

FIG. 5 COMPARATIVE EXAMPLE

MALFUNCTION DIAGNOSING APPARATUS FOR VEHICLE

CROSS REFERENCE TO RELATED APPLICATION

This application is based on Japanese Patent Application No. 2010-171600 filed on Jul. 30, 2010, the disclosure of which is incorporated herein by reference.

FIELD OF THE INVENTION

The present invention relates to a malfunction diagnosing apparatus for a vehicle, which has an internal combustion engine and/or an electric motor as a driving source thereof and according to which a safety is improved when an acceleration pedal and a brake pedal are operated at the same time.

BACKGROUND OF THE INVENTION

According to one of prior arts (for example, Japanese Patent Publication No. 2005-291030), an engine operation is forcibly changed to an idling operation when an electronic control unit determines that an acceleration pedal and a brake pedal are respectively operated by predetermined amounts at the same time, in order to prevent an over-drive of a vehicle in a case that a vehicle driver accidentally steps on the acceleration pedal and the brake pedal at the same time.

According to another prior art (International Patent Publication (published in Japan) No. H2-502558), a safety circuit is provided so that an output of a driving source is changed to a predetermined smaller value when a brake pedal and an acceleration pedal are operated at the same time. According to the above prior art, the safety circuit will not be operated when it is detected, based on a differential value with time of an output from an acceleration sensor, that a vehicle driver newly stepped on the acceleration pedal, even in a case that a control unit determines that the brake pedal is operated.

According to a further prior art (U.S. Pat. No. 6,881,174), in a case that an acceleration pedal and a brake pedal are operated at the same time, an engine output is suppressed only when a required braking amount based on an operational amount of the brake pedal is larger than a required accelerating amount based on an operational amount of the acceleration pedal.

The inventors of the present invention have been conducting researches for determining whether there may be any malfunction in a control system for a driving source, such as an internal combustion engine, an electric motor and so on, which is/are mounted in a vehicle. For example, a required output value for a malfunction diagnosis is calculated based on an acceleration opening degree, which is detected by an acceleration sensor. Then, a malfunction determining threshold is set based on the above required output value for the malfunction diagnosis, and such malfunction determining threshold is compared with an estimated value of an output of the driving source (an estimated value of an actual output), so as to determine whether there may be any malfunction in the control system for the driving source. The inventors have found out new problems to be solved in the course of the above researches.

In a control system for the driving source, for which an output limiting control is carried out for limiting an output of the driving source when an acceleration pedal as well as a brake pedal is stepped on at the same time, it is possible to use a malfunction determining threshold which is calculated in the same manner to a situation in which the output limiting control is not carried out. However, in such a case, the malfunction determining threshold (which does not come under the influence of the output limiting control) is set to the estimated value of the output, which comes under the influence of the output limiting control. Therefore, it is not possible to set an appropriate malfunction determining threshold with respect to the estimated value of the output during the output limiting control. As a result, if any malfunction occurs in the control system for the driving source during the output limiting control is carried out, a time period may become longer, in which the estimated value of the output has exceeded the malfunction determining threshold and the malfunction is finally detected. Namely, a time period may become longer, in which a fail safe transaction will be carried out.

SUMMARY OF THE INVENTION

The present invention is made in view of the above problems. It is an object of the present invention to provide a malfunction diagnosing apparatus for a vehicle, according to which an output limiting control is carried out when an acceleration pedal and a brake pedal are stepped on at the same time, and a malfunction in a control system for a driving source for the vehicle can be detected at an earlier stage even when such malfunction has occurred during a period in which the output limiting control is carried out.

According to a feature of the invention (for example, as defined in the claim 1), a malfunction diagnosing apparatus is applied to a vehicle, which has at least one of an internal combustion engine and an electric motor as a driving source for the vehicle. The malfunction diagnosing apparatus has; an acceleration detecting device for detecting an operational condition of an acceleration pedal; a brake detecting device for detecting an operational condition of a brake pedal; and an output limiting device for carrying out an output limiting control in order to limit an output of the driving source, when an operation of the acceleration pedal is detected by the acceleration detecting device and an operation of the brake pedal is detected by the brake detecting device.

The malfunction diagnosing apparatus further has a malfunction diagnosing device; which calculates a required output value for a malfunction diagnosis based on an operational amount detected by the acceleration detecting device; which sets a malfunction determining threshold in accordance with the required output value for the malfunction diagnosis; and which compares an estimated output value of the driving source or a control command value outputted from an engine control unit to the driving source with the malfunction determining threshold so as to determine whether there is a malfunction in a control system for the driving source. The malfunction diagnosing device limits the required output value for the malfunction diagnosis to a predetermined limiting value, when the operation of the acceleration pedal is detected by the acceleration detecting device and the operation of the brake pedal is detected by the brake detecting device.

According to the above feature, when the operation of the acceleration pedal as well as the operation of the brake pedal is detected, namely when the output limiting control is carried out for limiting the output of the driving source, it is possible to limit the required output value for the malfunction diagnosis depending on a situation in which the output of the driving source is limited by the output limiting control. In addition, when the malfunction determining threshold is set in accordance with the required output value for the malfunction diagnosis, it is possible to set an appropriate malfunction determining threshold with respect to the estimated output value or the control command value which may come under the influence of the output limiting control. As a result, it is possible to prevent a time period from becoming longer, in which the estimated output value or the control command value exceeds the malfunction determining threshold and the malfunction is thereby detected, even in the case that the malfunction has occurred in the control system for the driving source during the output limiting control is carried out. It is, therefore, possible to detect the malfunction earlier and to carry out the fail safe transaction in the earlier stage.

According to another feature of the invention (for example, as defined in the claim 2), the malfunction determining threshold may be changed in conjunction with the output limiting control. Namely, the malfunction determining threshold can be changed depending on a situation, in which the output of the driving source is limited when the output limiting control is carried out. It is, therefore, possible to set the appropriate malfunction determining threshold with respect to the estimated output value or the control command value, which may come under the influence of the output limiting control.

According to a further feature of the invention (for example, as defined in the claim 3), when the estimated output value of the driving source or the control command value outputted to the driving source exceeds the malfunction determining threshold, the malfunction diagnosing device determines whether there is a malfunction in a control system for the driving source, depending on a condition whether a continuous time during which the estimated output value or the control command value is larger than the malfunction determining threshold exceeds a determination time period. The determination time period may be changed in conjunction with the output limiting control carried out by the output limiting device.

According to such a feature, it is possible to change the determination time period shorter when the output limiting control is carried out. Therefore, it is possible to make a time period shorter, in which the continuous time exceeds the determination time period and the malfunction is thereby detected, when the estimated output value or the control command value exceeds the malfunction determining threshold. It is, therefore, possible to detect the malfunction earlier.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

The present invention will be explained by way of embodiments with reference to the drawings.

First Embodiment

A first embodiment of the present invention will be explained with reference to FIGS. 1 to 6.

Figure 1:
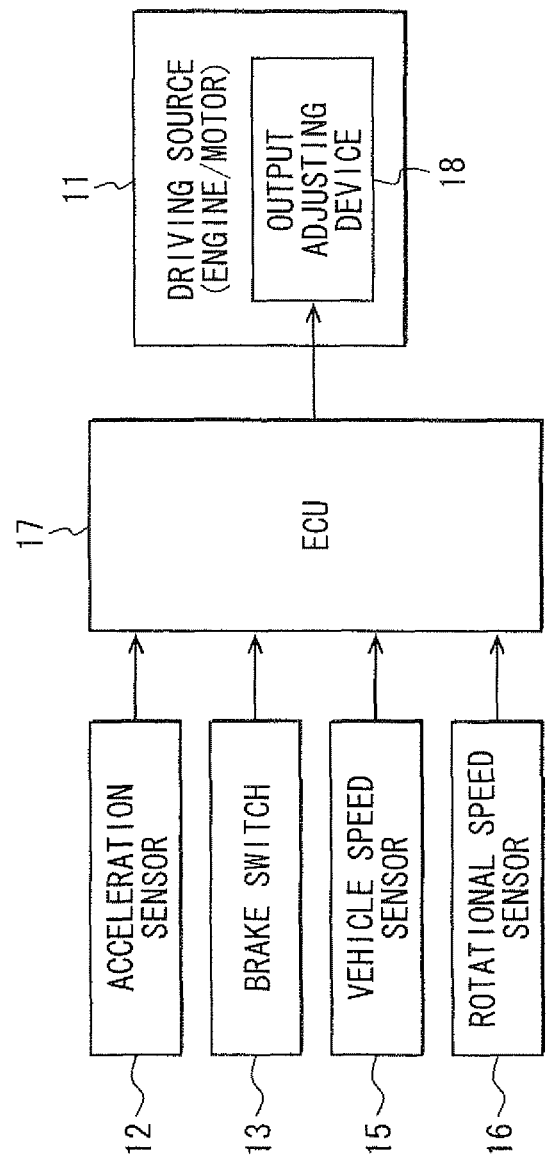
FIG. 1 is a block diagram showing a structure for a system according to a first embodiment of the present invention.

At first, a system structure of the first embodiment will be explained with reference to FIG. 1. In a vehicle, either an internal combustion engine or an electric motor, or both of them are mounted as a driving source 11. Therefore, the vehicle may be a vehicle which is driven by the internal combustion engine alone, a hybrid vehicle which is driven by the internal combustion engine and/or the electric motor depending on an operating condition of the vehicle, or an electric vehicle which is driven by the electric motor alone.

The vehicle has an acceleration sensor 12 (a detecting device for operation of an acceleration pedal) for detecting an operating stroke of an acceleration pedal (an acceleration opening degree), a brake switch 13 (a detecting device for operation of a brake pedal) which is turned on or off depending on a brake operation or a release of the braking operation, a vehicle speed sensor 15 for detecting vehicle speed, and a rotational speed sensor 16 for detecting rotational speed of the driving source 11. Detection signals of those sensors and switch are inputted to an electronic engine control unit (ECU) 17 for controlling output of the driving source 11.

The ECU 17 sets a target output (a required output value) based on the acceleration opening degree (the operating stroke of the acceleration pedal) detected by the acceleration sensor 12 during a vehicle operation. The ECU 17 controls an output adjusting device 18 so as to adjust the output of the driving source 11 in such a way that the output of the driving source 11 comes close to the target output.

For example, in a case of the vehicle, which is driven by the internal combustion engine (the driving source 11) alone, the output adjusting device 18 includes an electronic throttle control system for electronically controlling a throttle valve opening degree, a fuel injection control system for controlling fuel injection amount and so on. In the case of the electric vehicle, which is driven by the electric motor (the driving source 11) alone, the output adjusting device 18 includes an inverter, which controls the output of the electric motor. In the case of the hybrid vehicle, which is driven by the engine and/or the electric motor (the driving source 11), both of the output adjusting devices for the engine and the electric motor are provided.

Figure 3:
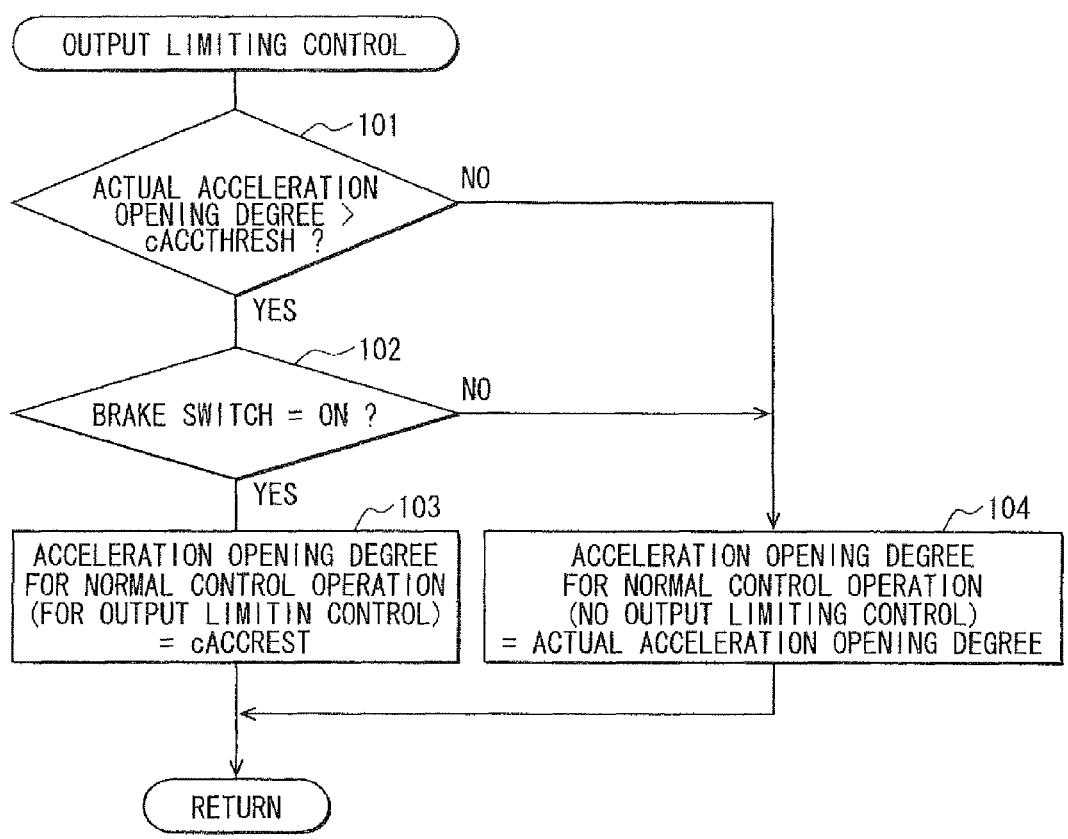
FIG. 3 is a flowchart showing a process for a routine of an output limiting control.

The ECU 17 carries out a routine for the output limiting control (explained below) of FIG. 3, according to which the output of the driving source 11 is controlled to be lower than a predetermined output limiting value, when the ECU 17 determines that both of the acceleration pedal and the brake pedal are operated (stepped on by a vehicle driver), in other words, when the operation of the acceleration pedal is detected by the acceleration sensor 12 while the operation of the brake pedal is detected by the brake switch 13. The above predetermined output limiting value for the driving source 11 is higher than an output at an idling operation of the engine, so that such an output is obtained with which it is possible to drive the vehicle at a low speed, which is relatively safe.

Figure 2:
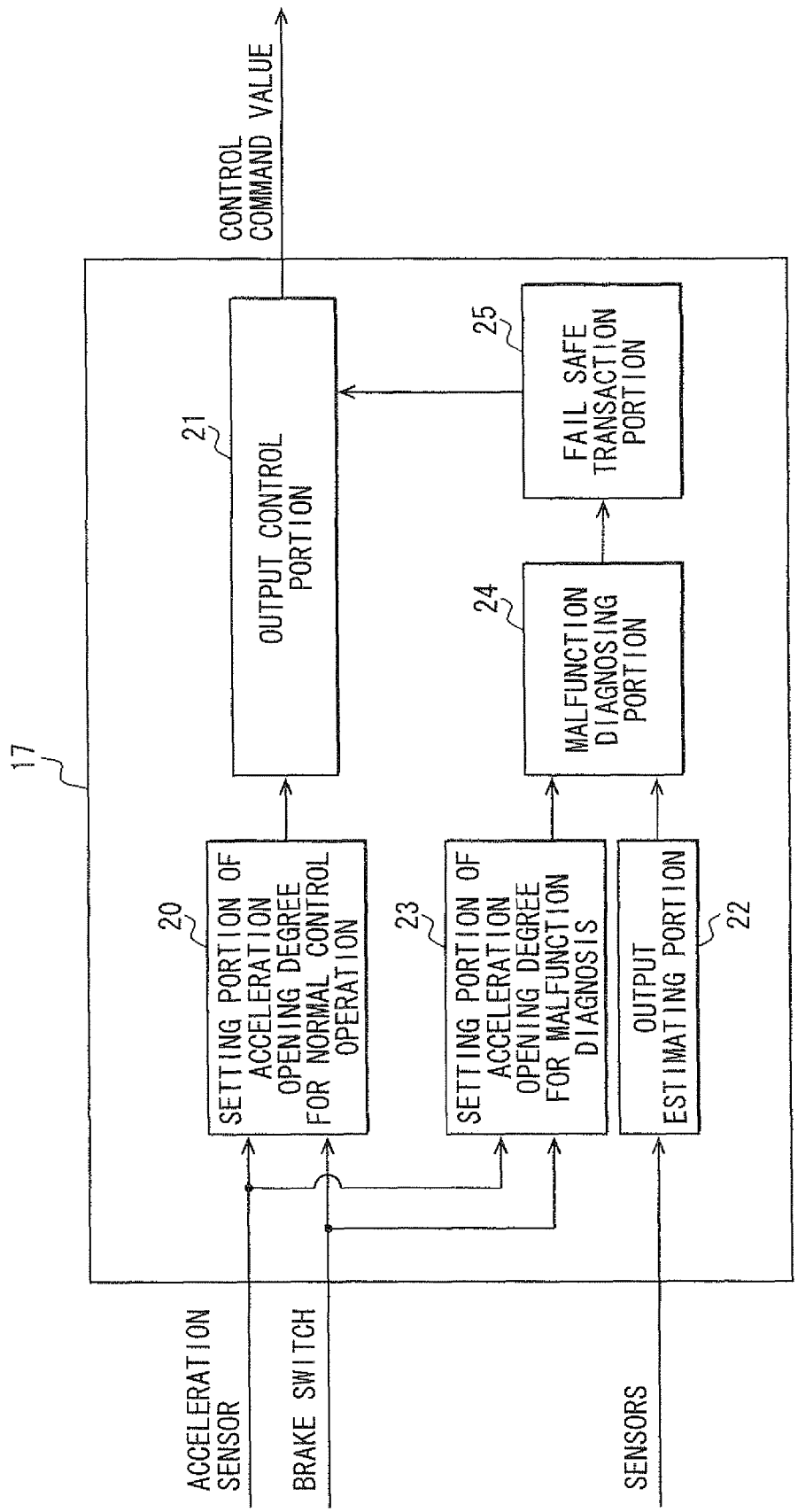
FIG. 2 is a block diagram schematically showing a malfunction diagnosing system according to the first embodiment of the present invention.

More exactly, as shown in FIG. 2, a setting portion 20 of the acceleration opening degree for a normal control operation (including an output limiting control without diagnosis) normally sets an actual acceleration opening degree, which is detected by the acceleration sensor 12, as an acceleration opening degree for the normal control operation. However, the setting portion 20 of the acceleration opening degree for the normal control operation sets the acceleration opening degree for the normal control operation at a predetermined acceleration limiting value, when the ECU 17 determines that both of the acceleration pedal 12 and the brake switch 13 are operated based on the respective detection signals from the acceleration pedal 12 and the brake switch 13.

Then, an output control portion 21 calculates the target output (the required output value) based on the acceleration opening degree for the normal control operation. In addition, the output control portion 21 calculates a control command value (that is, a command value to be outputted to the output adjusting device 18), based on the above target output. As above, when the ECU 17 determines that both of the acceleration pedal and the brake switch are operated, the acceleration opening degree for the normal control operation (which is used for calculating the target output) is limited to the predetermined acceleration limiting value, so that the output of the driving source 11 is correspondingly limited to such a value lower than the predetermined output limiting value.

The ECU 17 further carries out a routine for the malfunction diagnosis (explained below) of FIG. 4, according to which a required output value for the malfunction diagnosis is calculated based on the acceleration opening degree detected by the acceleration sensor 12. Then, an estimated value for the output (an estimated value for an actual output: also referred to as an estimated output value) of the driving source 11 is compared with a threshold value for malfunction determination (also referred to as a malfunction determining threshold), which is set in accordance with the required output value for the malfunction diagnosis, to thereby determine whether there is a malfunction in the control system for the driving source 11. When the ECU 17 determines that both of the acceleration pedal and the brake switch are operated, in other words, when the output limiting control is carried out for limiting the output of the driving source 11, the required output value for the malfunction diagnosis is limited to a value lower than a predetermined limiting value. The predetermined limiting value for the required output value for the malfunction diagnosis is set at such a value, which is equal to or close to the predetermined output limiting value of the driving source 11 for the normal control operation.

More exactly, as shown in FIG. 2, an output estimating portion 22 calculates the estimated value for the output (the estimated output value) of the driving source 11 by use of a map or a mathematical formula based on detection signals from various sensors. In addition, a setting portion 23 of the acceleration opening degree for the malfunction diagnosis normally sets the actual acceleration opening degree, which is detected by the acceleration sensor 12, as an acceleration opening degree for the malfunction diagnosis. However, the setting portion 23 of the acceleration opening degree for the malfunction diagnosis sets the acceleration opening degree for the malfunction diagnosis at a predetermined acceleration limiting value, when the ECU 17 determines that both of the acceleration pedal 12 and the brake switch 13 are operated based on the respective detection signals from the acceleration pedal 12 and the brake switch 13. The above predetermined acceleration limiting value of the acceleration opening degree for the malfunction diagnosis is set at such a value, which is equal to or close to the predetermined acceleration limiting value of the driving source 11 for the normal control operation.

A malfunction diagnosing portion 24 calculates the required output value for the malfunction diagnosis by use of a map or a mathematical formula based on the acceleration opening degree for the malfunction diagnosis. The malfunction diagnosing portion 24 sets the threshold value for the malfunction determination (the malfunction determining threshold) in accordance with the required output value for the malfunction diagnosis. The malfunction determining threshold is set at such a value, which is equal to or close to the required output value for the malfunction diagnosis.

As above, in the case that both of the acceleration pedal and the brake pedal are operated, namely when the output limiting control is carried out for limiting the output of the driving source 11, the acceleration opening degree for the malfunction diagnosis is set at the predetermined acceleration limiting value. The required output value for the malfunction diagnosis is thereby limited to the value lower than the predetermined value. Namely, the required output value for the malfunction diagnosis is limited depending on a situation that the output of the driving source 11 is limited by the output limiting control. Since the malfunction determining threshold is set in accordance with the required output value for the malfunction diagnosis, it is possible to set an appropriate malfunction determining threshold with respect to the estimated output value (the estimated value for the actual output) which may be influenced by the output limiting control.

Then, the malfunction diagnosing portion 24 determines whether the estimated output value is larger than the malfunction determining threshold or not. In the case that the estimated output value is determined as being larger than the malfunction determining threshold, the ECU 17 determines that there is a malfunction in the control system for the driving source 11. A fail-safe control portion 25 carries out a proper transaction for the fail safe.

A process for the routine of the output limiting control (FIG. 3) as well as a process of the routine for the malfunction diagnosis (FIG. 4) will be explained, wherein those processes are carried out by the ECU 17.

[The Routine for the Output Limiting Control]

The process of the routine for the output limiting control is repeatedly carried out at a predetermined cycle during a switch for power supply to the ECU 17 is turned on. When the process starts, the ECU 17 determines at first at a step 101 whether the actual acceleration opening degree detected by the acceleration sensor 12 is larger than a predetermined opening value "cACCTHRESH". The predetermined opening value "cACCTHRESH" is set at such a value, which is equal to or slightly larger than a predetermined acceleration limiting value "cACCREST" (explained below).

When it is determined at the step 101 that the actual acceleration opening degree is smaller than the predetermined opening value "cACCTHRESH", the process goes to a step 104, at which the actual acceleration opening degree detected by the acceleration sensor 12 is set as the acceleration opening degree for the normal control operation (without output limiting control). In case of NO at the step 101, the ECU 17 determines that it is not necessary to carry out the output limiting control because the actual acceleration opening degree is small, even in a case that both of the acceleration pedal and the brake pedal are stepped on at the same time.

When it is determined at the step 101 that the actual acceleration opening degree is larger than the predetermined opening value "cACCTHRESH", the process goes to a step 102, at which the ECU 17 determines whether the brake switch 13 is turned on or not. When it is determined at the step 102 that the brake switch 13 is turned off, the process goes to the step 104. In case of NO at the step 102, it is likewise not necessary to carry out the output limiting control for the output of the driving source 11, because the brake switch 13 is turned off. As explained above, at the step 104, the actual acceleration opening degree detected by the acceleration sensor 12 is set as the acceleration opening degree for the normal control operation (without the output limiting control).

When it is determined at the step 102 that the brake switch 13 is turned on, the ECU 17 determines that a condition for executing the output limiting control is satisfied. Therefore, the process goes to a step 103, at which the acceleration opening degree for the normal control operation is set at the predetermined acceleration limiting value "cACCREST", which will be used for calculating the target output. As a result, the output of the driving source 11 is limited to the value lower than the predetermined output limiting value.

It is possible to provide a certain execution time delay between a timing, at which the condition for executing the output limiting control is satisfied, and a timing, at which the output of the driving source 11 is actually limited. It is also possible to provide another time delay when an operational mode for the driving source is changed from the output limiting control back to the normal control (without the output limiting control). The above time delay prevents a chattering phenomenon of the output limiting control, which may be caused by frequent turn-on and turn-off of the brake switch 13.

[The Routine for the Malfunction Diagnosis]

Figure 4:
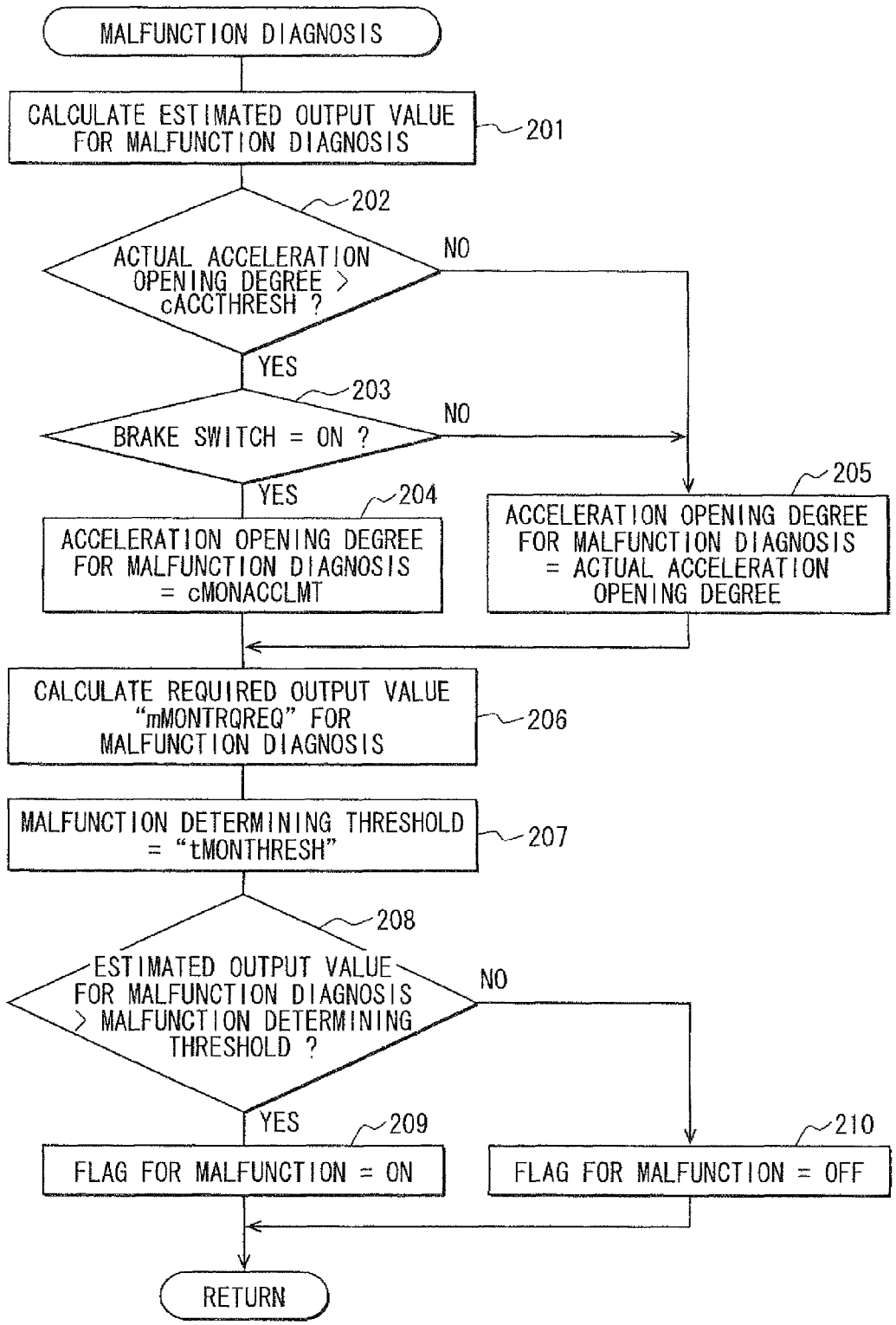
FIG. 4 is a flowchart showing a process for a malfunction diagnosing routine according to the first embodiment of the present invention.

The process of the routine for the malfunction diagnosis shown in FIG. 4 is likewise repeatedly carried out at a predetermined cycle during the switch for power supply to the ECU 17 is turned on. When the process starts, the ECU 17 calculates at first, at a step 201, the estimated output value (the estimated value for the actual output) for the malfunction diagnosis, by use of a map or a mathematical formula, based on the detection signals from the various sensors (for example, the vehicle speed sensor 15, the rotational speed sensor 16 and so on).

Then, the process goes to a step 202, at which the ECU 17 determines whether the actual acceleration opening degree detected by the acceleration sensor 12 is larger than the predetermined opening value "cACCTHRESN". When it is determined at the step 202 that the actual acceleration opening degree is smaller than the predetermined opening value "cACCTHRESH", the ECU 17 determines that it is not necessary to carry out the output limiting control. Therefore, the process goes to a step 205, at which the actual acceleration opening degree detected by the acceleration sensor 12 is set as the acceleration opening degree for the malfunction diagnosis.

On the other hand, when it is determined at the step 202 that the actual acceleration opening degree is larger than the predetermined opening value "cACCTHRESH", the process goes to a step 203, at which the ECU 17 determines whether the brake switch 13 is turned on or not. When the brake switch 13 is turned off (No at the step 203), the ECU 17 determines that it is not necessary to carry out the output limiting control and the process goes to the step 205. Therefore, at the step 205, as explained above, the actual acceleration opening degree detected by the acceleration sensor 12 is set as the acceleration opening degree for the malfunction diagnosis.

When, at the step 203, the ECU 17 determines that the brake switch 13 is tuned on, the ECU 17 determines that the output limiting control will be carried out, because a condition for executing the output limiting control is satisfied as a result that the actual acceleration opening degree is larger than the predetermined opening value "cACCTHRESH" and the brake pedal is stepped on. The process goes to a step 204, at which the acceleration opening degree for the malfunction diagnosis is set at a predetermined acceleration limiting value "cMONACCLMT". The predetermined acceleration limiting value "cMONACCLMT" for the malfunction diagnosis is set at such a value, for example, which is equal to or close to the predetermined acceleration limiting value "cACCREST" for the acceleration opening degree for the normal control operation (with the output limiting control).

Then, the process goes to a step 206, at which the ECU 17 calculates the required output value "mMONTRQREQ" for the malfunction diagnosis, by use of a map or a mathematical formula, based on the acceleration opening degree for the malfunction diagnosis. The process further goes to a step 207, at which a value "tMONTHRESH" calculated in accordance with the required output value "mMONTRQREQ" for the malfunction diagnosis is set as a malfunction determining threshold "tMONTHRESH", which is equal to or slightly larger than the required output value "mMONTRQREQ" for the malfunction diagnosis.

Then, the process goes to a step 208, at which the ECU 17 determines whether the estimated output value for the malfunction diagnosis is larger than the malfunction determining threshold "tMONTHRESH".

When the estimated output value for the malfunction diagnosis is determined at the step 208 as being larger than the malfunction determining threshold "tMONTHRESH", that is, when Yes at the step 208, the process goes to a step 209. In this situation, since the ECU 17 determines that there is a malfunction in the control system for the driving source 11, a flag for the malfunction is turned on (set to an "ON" condition). As a result, a warning lamp (not shown) provided in an instrument panel for a vehicle driver is turned on or flashed on and off. Alternatively, a warning display portion (not shown) may be provided in the instrument panel for the vehicle driver and a warning is displayed in such display portion to inform the vehicle driver of the malfunction. In addition, a proper transaction for the fail safe is carried out.

On the other hand, when the ECU 17 determines that the estimated output value for the malfunction diagnosis is smaller than the malfunction determining threshold "tMON- THRESH", that is, when No at the step 208, the process goes to a step 210. Since the ECU 17 determines, in this situation, that there is no malfunction in the control system for the driving source 11, the flag for the malfunction is turned off (set to an "OFF" condition).

The processes for the malfunction diagnosis in case of the comparative example and in case of the present invention will be explained with reference to the time charts of FIG. 5 (the comparative example) and FIG. 6 (the present invention).

Figure 5:
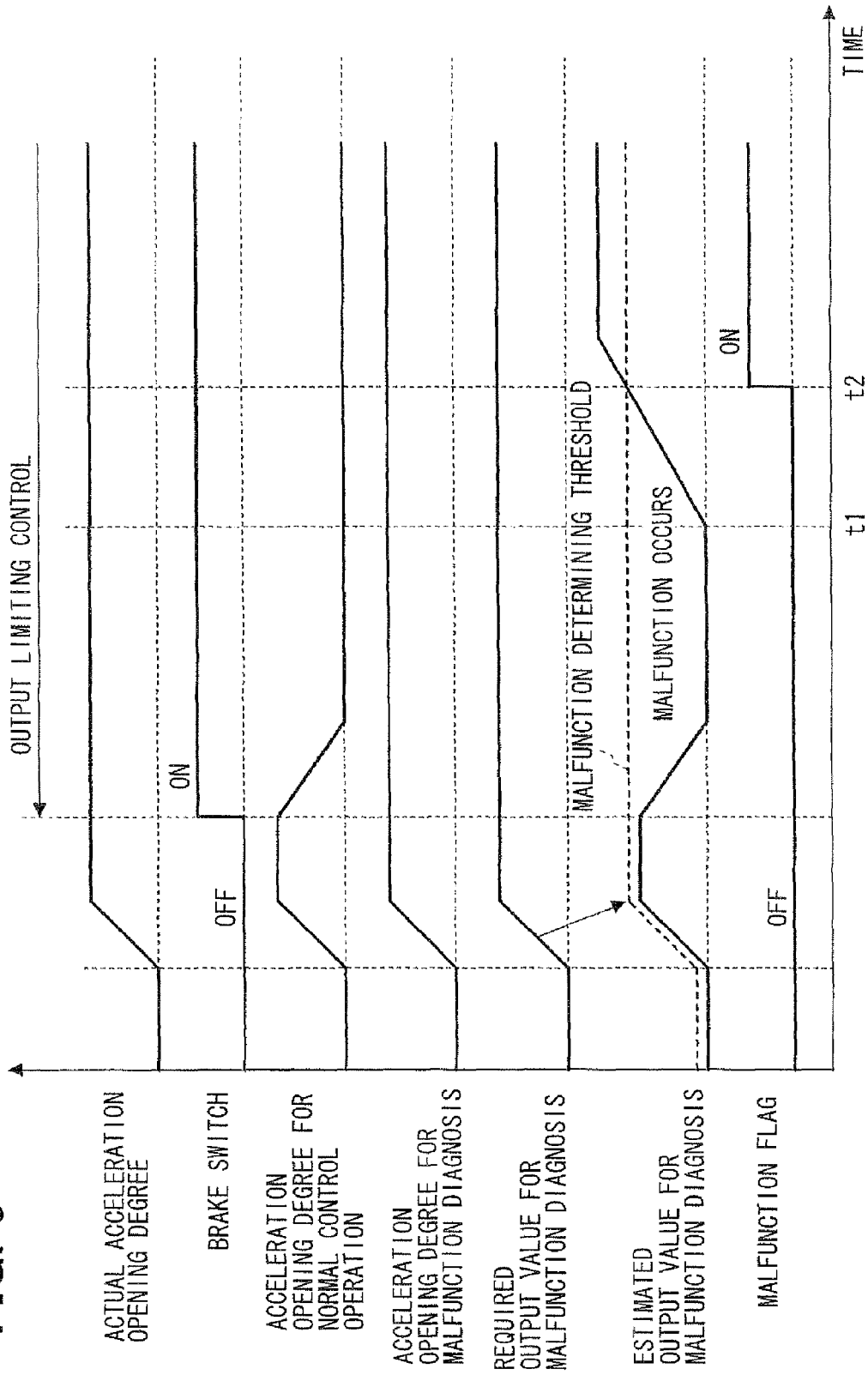
FIG. 5 is a time chart showing execution of malfunction diagnosis in a comparative example.

According to the process of the malfunction diagnosis of the comparative example shown in FIG. 5, the actual acceleration opening degree, which is detected by the acceleration sensor 12, is always set as the acceleration opening degree for the malfunction diagnosis, irrespectively whether or not the output limiting control is being carried out. The required output value for the malfunction diagnosis is calculated based on the acceleration opening degree for the malfunction diagnosis. Then, the malfunction determining threshold is set in accordance with the required output value for the malfunction diagnosis.

As a result, the malfunction determining threshold, which does not come under the influence of the output limiting control, is set to the estimated output value (estimated value for the actual output), which comes under the influence of the output limiting control. Therefore, it is not possible to set the appropriate malfunction determining threshold to the estimated output value, during a period in which the output limiting control is carried out.

In a case that any malfunction occurs (at a timing t1) in the control system for the driving source 11, during the period in which the output limiting control is carried out, a time duration between the timing t1 and a timing t2 (at which the estimated output value for the malfunction diagnosis exceeds the malfunction determining threshold and thereby the ECU 17 determines that the malfunction has occurred) becomes longer. In other words, a longer duration is necessary until the transaction for the fail safe will be carried out.

Figure 6:
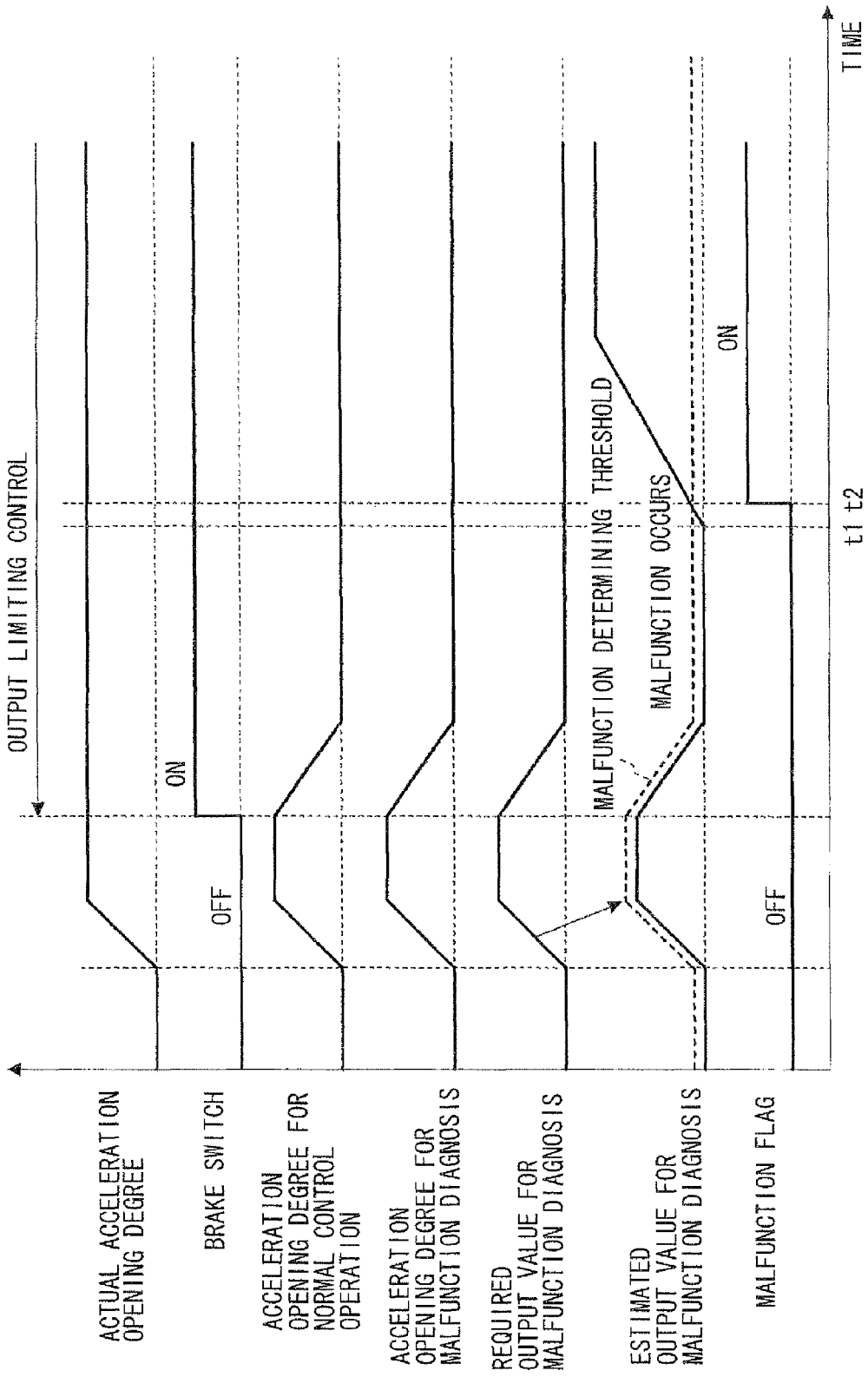
FIG. 6 is a time chart showing execution of malfunction diagnosis according to the first embodiment of the present invention.

On the other hand, according to the present embodiment of the invention, as shown in FIG. 6, the actual acceleration opening degree detected by the acceleration sensor 12 is set as the acceleration opening degree in the normal operating condition. However, in the case that the ECU determines, based on the detection signals from the acceleration sensor 12 and the brake switch 13, that both of the acceleration pedal and the brake pedal are stepped on at the same time, the acceleration opening degree for the malfunction diagnosis is limited to the predetermined acceleration limiting value. And based on such acceleration opening degree (limited to the predetermined acceleration limiting value) for the malfunction diagnosis, the required output value for the malfunction diagnosis is calculated. The malfunction determining threshold is set in accordance with the above required output value for the malfunction diagnosis.

As above, in the case that both of the acceleration pedal and the brake pedal are stepped on by the vehicle driver at the same time, in other words, when the output limiting control is carried out for limiting the output of the driving source 11, the acceleration opening degree for the malfunction diagnosis is set to the predetermined acceleration limiting value. The required output value for the malfunction diagnosis is thereby limited to the value lower than the predetermined value.

Namely, as a result that the output of the driving source 11 is limited by the output limiting control, the required output value for the malfunction diagnosis is correspondingly limited. Then, since the malfunction determining threshold is set in accordance with the required output value for the malfunction diagnosis, it becomes possible to set the appropriate malfunction determining threshold with respect to the estimated output value (the estimated value for the actual output), which comes under the influence of the output limiting control.

According to the above features, when the malfunction occurs in the control system for the driving source 11 at the timing t1 during the period in which the output limiting control is carried out, the time duration between the timing t1 and is the timing t2 (at which the estimated output value for the malfunction diagnosis exceeds the malfunction determining threshold and thereby the ECU 17 determines that the malfunction has occurred) becomes shorter. It is, therefore, possible to detect the malfunction in the earlier stage and to carry out the transaction for the fail safe earlier.

According to the above embodiment, the acceleration opening degree for the malfunction diagnosis is set at the predetermined acceleration limiting value, when the ECU determines that both of the acceleration pedal and the brake pedal are stepped on by the vehicle driver, in order that required output value for the malfunction diagnosis is limited. The invention, however, should not be limited to such embodiment. For example, the required output value for the malfunction diagnosis may be set to a predetermined limiting value, to thereby limit the required output value for the malfunction diagnosis.

Second Embodiment

A second embodiment of the present invention will be explained with reference to FIGS. 7 to 9, wherein the same reference numerals to the first embodiment are used for the purpose of designating such portions substantially equal to those in the first embodiment. Therefore, those portions different from the first embodiment will be explained. The system structure of the second embodiment is the same to that shown in FIG. 1.

According to the second embodiment, the ECU 17 carries out a routine for the malfunction diagnosis (explained below) of FIG. 8, according to which a required output value for the malfunction diagnosis is calculated based on the acceleration opening degree detected by the acceleration sensor 12. Then, an estimated output value of the driving source 11 is compared with a malfunction determining threshold, which is set in accordance with the required output value for the malfunction diagnosis, to thereby determine whether there is malfunction in the control system of the driving source 11. The malfunction determining threshold is changed in conjunction with the output limiting control.

Figure 7:
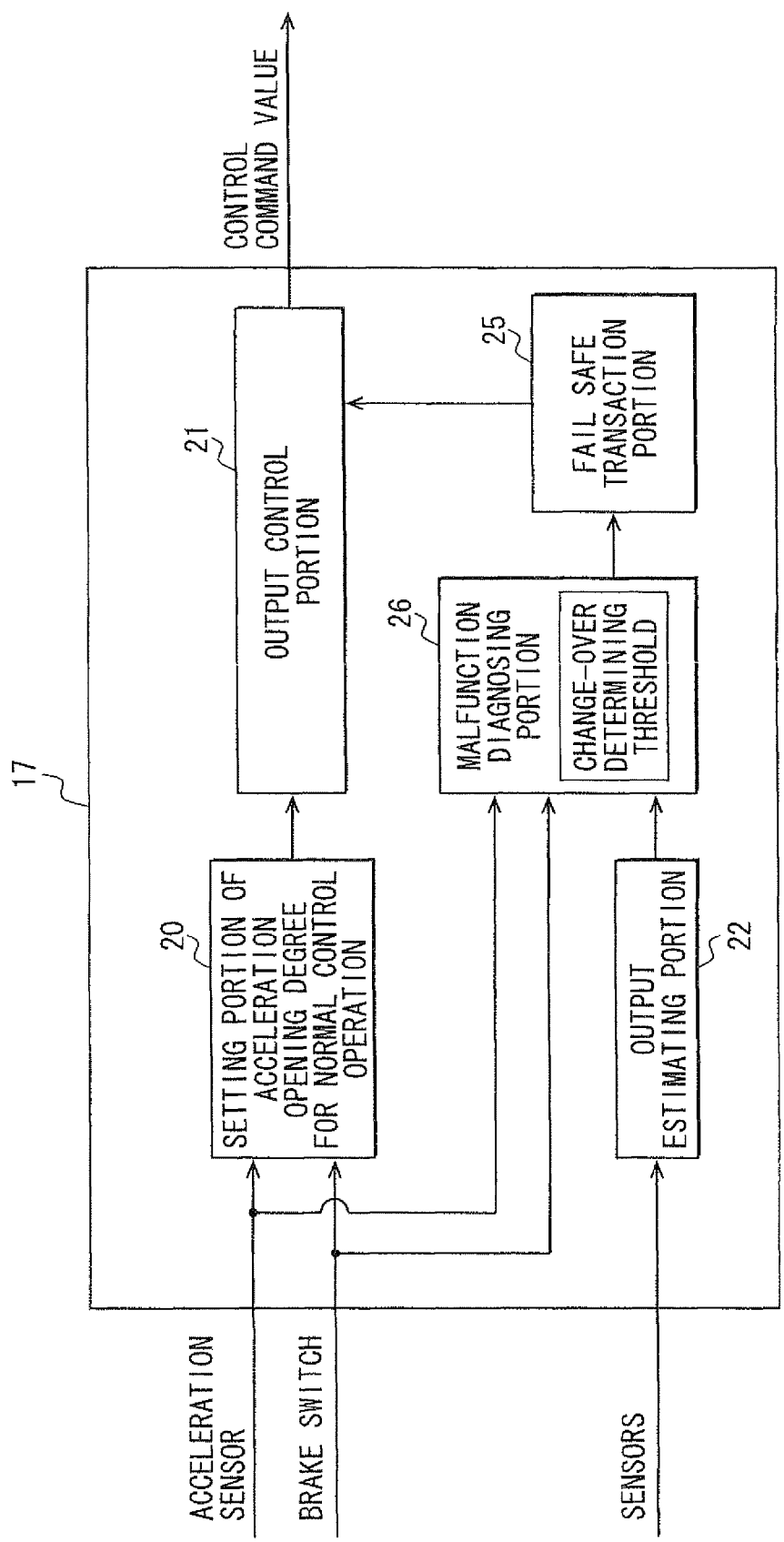
FIG. 7 is a block diagram schematically showing a malfunction diagnosing system according to a second embodiment of the present invention.

More exactly, as shown in FIG. 7, a malfunction diagnosing portion 26 sets the actual acceleration opening degree detected by the acceleration sensor 12 as the acceleration opening degree for the malfunction diagnosis, and calculates the required output value for the malfunction diagnosis, by use of a map or a mathematical formula, based on the acceleration opening degree for the malfunction diagnosis. In the normal operating condition (the acceleration pedal and the brake pedal are not stepped on at the same time, the malfunction determining threshold is set based on the required output value for the malfunction diagnosis. On the other hand, when the ECU 17 determines, based on the detection signals from the acceleration sensor 12 and the brake switch 13, that both of the acceleration pedal and the brake pedal are stepped on by the vehicle driver, the malfunction determining threshold is changed to a predetermined threshold limiting value. The predetermined threshold limiting value for the malfunction determining threshold is set to such a value, which is equal to or slightly larger than the output limiting value for the driving source 11.

As above, in the case that both of the acceleration pedal and the brake pedal are stepped on by the vehicle driver at the same time, in other words, when the output limiting control is carried out for limiting the output of the driving source 11, the acceleration opening degree for the malfunction determination is changed to the predetermined threshold limiting value. Therefore, it is possible to change the acceleration opening degree for the malfunction determination depending on a situation, in which the output of the driving source 11 is limited by the output limiting control. As a result, it is possible to set the appropriate malfunction determining threshold with respect to the estimated output value (the estimated value for the actual output) which comes under influence of the output limiting control.

A process for the routine of the malfunction diagnosis (FIG. 8) according to the second embodiment will be explained, wherein the process is carried out by the ECU 17.

Figure 8:
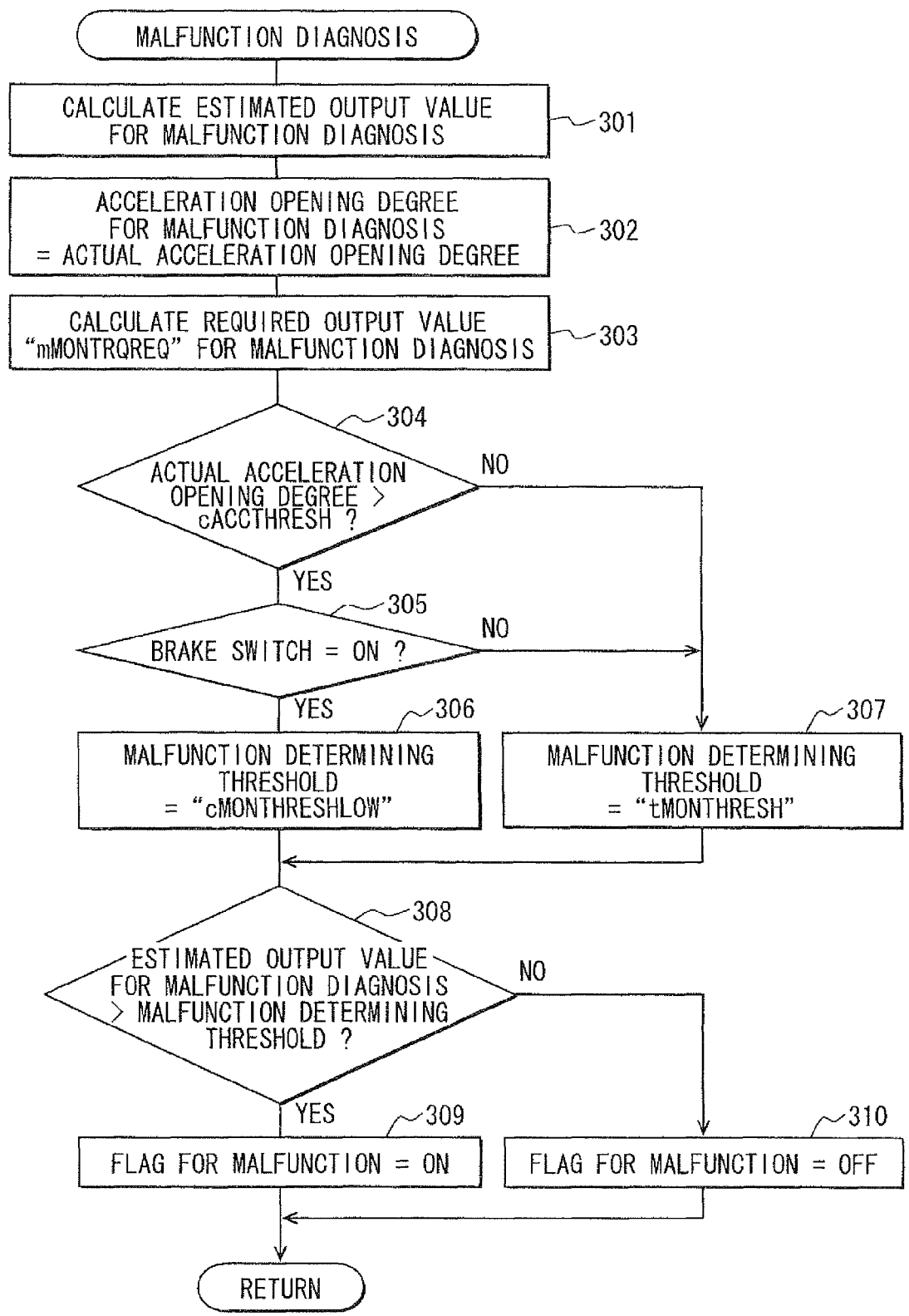
FIG. 8 is a flowchart showing a process for a malfunction diagnosing routine according to the second embodiment of the present invention.

The process of the routine for the malfunction diagnosis shown in FIG. 8 is repeatedly carried out at a predetermined cycle during the switch for power supply to the ECU 17 is turned on. When the process starts, the ECU 17 calculates at first, at a step 301, the estimated output value (the estimated value for the actual output) for the malfunction diagnosis, by use of the map or the mathematical formula, based on the detection signals from the various sensors.

Then, the process goes to a step 302, at which the ECU 17 sets the actual acceleration opening degree detected by the acceleration sensor 12 as the acceleration opening degree for the malfunction diagnosis. The process further goes to a step 303, at which the ECU calculates the required output value "mMONTRQREQ" for the malfunction diagnosis, by use of the map or the mathematical formula, based on the acceleration opening degree for the malfunction diagnosis.

At a step 304, the ECU determines whether the actual acceleration opening degree detected by the acceleration sensor 12 is larger than the predetermined opening value "cACCTHRESH".

When it is determined at the step 304 that the actual acceleration opening degree is smaller than the predetermined opening value "cACCTHRESH", the ECU 17 determines that it is not necessary to carry out the output limiting control. Therefore, the process goes to a step 307, at which the value "tMONTHRESH" calculated in accordance with the required output value "mMONTRQREQ" for the malfunction diagnosis is set as the malfunction determining threshold "tMONTHRESH". The value "tMONTHRESH" is equal to or slightly larger than the required output value "mMONTRQREQ" for the malfunction diagnosis.

On the other hand, when it is determined at the step 304 that the actual acceleration opening degree is larger than the predetermined opening value "cACCTHRESH", the process goes to a step 305, at which the ECU 17 determines whether the brake switch 13 is turned on or not. When the brake switch 13 is turned off (No at the step 305), the ECU 17 determines that it is not necessary to carry out the output limiting control and the process goes to the step 307. Therefore, at the step 307, as explained above, the value "tMONTHRESH", which is calculated in accordance with the required output value "mMONTRQREQ" for the malfunction diagnosis, is set as the malfunction determining threshold "tMONTHRESH".

When, at the step 305, the ECU 17 determines that the brake switch 13 is tuned on, the ECU 17 determines that the output limiting control will be carried out, because a condition for executing the output limiting control is satisfied as a result that the actual acceleration opening degree is larger than the predetermined opening value "cACCTHRESH" and the brake pedal is stepped on. The process goes to a step 306, at which the malfunction determining threshold is set at a predetermined threshold limiting value "cMONTHRESHLOW". The predetermined threshold limiting value "cMONTHRESHLOW" for the malfunction determining threshold is set at such a value, for example, which is equal to or slightly larger than the output limiting value for the driving source 11.

Figure 9:
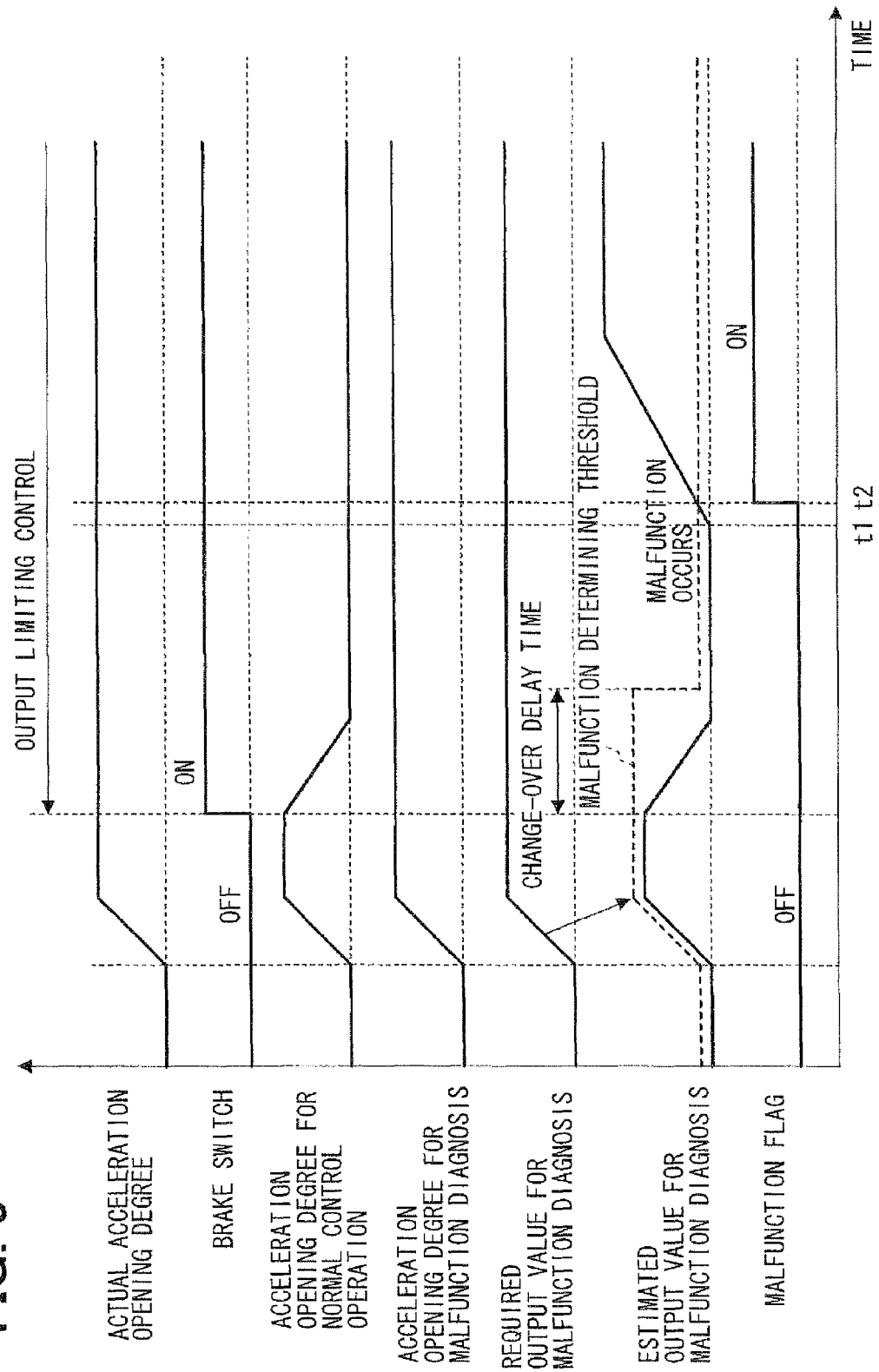
FIG. 9 is a time chart showing execution of malfunction diagnosis according to the second embodiment of the present invention.

As shown in FIG. 9 (explained below), a change-over delay time may be provided between a timing, at which a condition for executing the output limiting control is satisfied, and a timing, at which the malfunction determining threshold is actually changed to the predetermined threshold limiting value "cMONTHRESHLOW".

Back to FIG. 8, the process goes to a step 308, at which the ECU 17 determines whether the estimated output value for the malfunction diagnosis is larger than the malfunction determining threshold ("cMONTHRESHLOW" or "tMONTHRESH").

When the estimated output value for the malfunction diagnosis is determined at the step 308 as being larger than the malfunction determining threshold, that is, when Yes at the step 308, the process goes to a step 309. In this situation, since the ECU 17 determines that there is a malfunction in the control system for the driving source 11, a flag for the malfunction is turned on (set to an "ON" condition). As a result, a warning is made to the vehicle driver by the warning lamp or the warning display portion. In addition, a proper transaction for the fail safe is carried out.

On the other hand, when the ECU 17 determines that the estimated output value for the malfunction diagnosis is smaller than the malfunction determining threshold, that is, when No at the step 308, the process goes to a step 310. Since the ECU 17 determines, in this situation, that there is no malfunction in the control system for the driving source 11, the flag for the malfunction is turned off (set to an "OFF" condition).

According to the malfunction diagnosis of the above explained second embodiment, as shown in FIG. 9, the ECU sets the actual acceleration opening degree detected by the acceleration sensor 12 as the acceleration opening degree for the malfunction diagnosis, and calculates the required output value for the malfunction diagnosis based on such acceleration opening degree for the malfunction diagnosis. In the normal operating condition, the malfunction determining threshold is set based on the required output value for the malfunction diagnosis. On the other hand, when the ECU 17 determines, based on the detection signals from the acceleration sensor 12 and the brake switch 13, that both of the acceleration pedal and the brake pedal are stepped on by the vehicle driver, the malfunction determining threshold is changed to the predetermined threshold limiting value.

As above, when the ECU determines that both of the acceleration pedal and the brake pedal are stepped on, namely when the output limiting control is carried out for limiting the output of the driving source 11, the malfunction determining threshold is changed to the predetermined threshold limiting value. As a result, it is possible to change the malfunction determining threshold depending on the situation in which the output of the driving source 11 is limited by the output limiting control. It is, therefore, possible to set the appropriate malfunction determining threshold with respect to the estimated output value (the estimated value for the actual output) which comes under the influence of the output limiting control. According to the above features, when any malfunction occurs in the control system for the driving source 11, during the period in which the output limiting control is carried out, it is possible to make a time period from the timing t1 to the timing t2 shorter. The timing t1 is a timing, at which the malfunction occurs, while the timing t2 is a timing, at which the estimated output value exceeds the malfunction determining threshold so that the ECU determines that the malfunction has occurred. It is, therefore, possible to detect the malfunction in the earlier stage and to carry out the transaction for the fail safe earlier.

Third Embodiment

A third embodiment of the present invention will be explained with reference to FIGS. 10 and 11. Different portions from the second embodiment will be explained.

According to the third embodiment, the ECU 17 carries out the routine for the malfunction diagnosis of FIG. 10 (explained below). The ECU calculates (sets) the malfunction determining threshold based on the required output value for the malfunction diagnosis and compares such malfunction determining threshold with the estimated output value of the driving source 11. When the estimated output value becomes larger than the malfunction determining threshold, the ECU determines whether a continuous time (during which the estimated output value is larger than the malfunction determining threshold) exceeds a predetermined time period (also referred to as a determination time period). When such continuous time is longer than the determination time period, the ECU determines that there is malfunction in the control system for the driving source 11. In addition, the determination time period is changed depending on the output limiting control.

More exactly, in a normal operating condition, the determination time period is set as a predetermined value T1. When the ECU determines, based on the detection signals from the acceleration sensor 12 and the brake switch 13, that both of the acceleration pedal and the brake pedal are stepped on, the determination time period is changed to a predetermined period limiting value T2. The period limiting value T2 is set at such a value smaller than the value T1.

As above, when the ECU determines that both of the acceleration pedal and the brake pedal are stepped on, namely when the output limiting control is carried out for limiting the output of the driving source 11, the determination time period is changed to the predetermined period limiting value T2 so that the determination time period becomes shorter. According to such a change of the determination time period, it becomes possible to make a time period shorter, during which the estimated output value exceeds the malfunction determining threshold and the continuous time exceeds the determination time period so that the ECU finally determines the malfunction.

A process of the routine for the malfunction diagnosis (FIG. 10) according to the third embodiment will be explained, wherein the process is carried out by the ECU 17.

Figure 10:
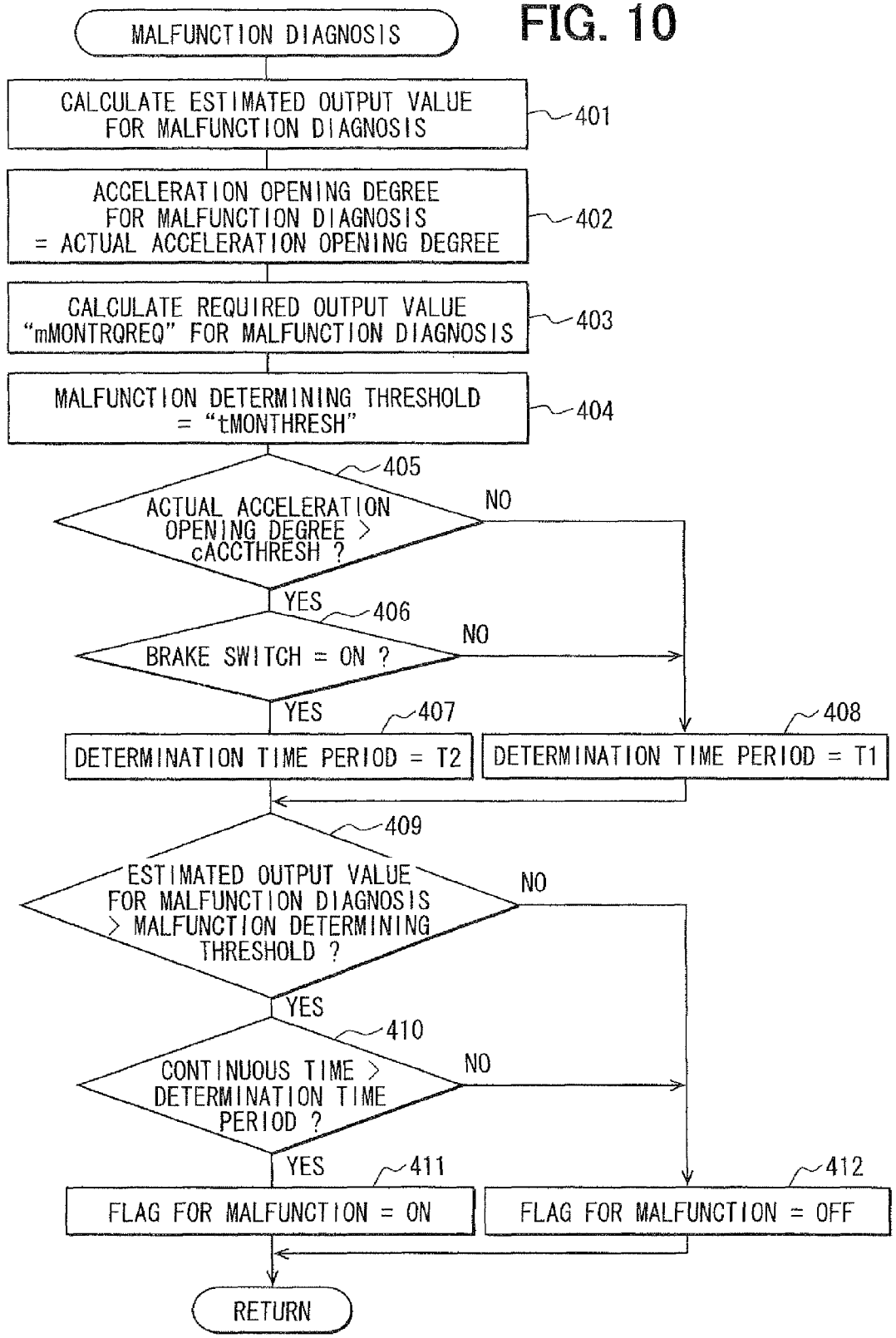
FIG. 10 is a flowchart showing a process for a malfunction diagnosing routine according to a third embodiment of the present invention.

The process of the routine for the malfunction diagnosis shown in FIG. 10 is repeatedly carried out at a predetermined cycle during the switch for power supply to the ECU 17 is turned on. When the process starts, the ECU 17 calculates at first, at a step 401, the estimated output value (the estimated value for the actual output) for the malfunction diagnosis, by use of the map or the mathematical formula, based on the detection signals from the various sensors.

Then, the process goes to a step 402, at which the ECU 17 sets the actual acceleration opening degree detected by the acceleration sensor 12 as the acceleration opening degree for the malfunction diagnosis. The process further goes to a step 403, at which the ECU calculates the required output value "mMONTRQREQ" for the malfunction diagnosis, by use of the map or the mathematical formula, based on the acceleration opening degree for the malfunction diagnosis.

Then, the process goes to a step 404, at which the value "tMONTHRESH" calculated in accordance with the required output value "mMONTRQREQ" for the malfunction diagnosis is set as the malfunction determining threshold "tMONTHRESH". The value "tMONTHRESH" is equal to or slightly larger than the required output value "mMONTRQREQ" for the malfunction diagnosis.

At a next step 405, the ECU determines whether the actual acceleration opening degree detected by the acceleration sensor 12 is larger than the predetermined opening value "cACCTHRESH".

When it is determined at the step 405 that the actual acceleration opening degree is smaller than the predetermined opening value "cACCTHRESH", the ECU 17 determines that it is not necessary to carry out the output limiting control. Therefore, the process goes to a step 408, at which the determination time period is set at the predetermined value T1.

On the other hand, when it is determined at the step 405 that the actual acceleration opening degree is larger than the predetermined opening value "cACCTHRESH", the process goes to a step 406, at which the ECU 17 determines whether the brake switch 13 is turned on or not. When the brake switch 13 is turned off (No at the step 406), the ECU 17 determines that it is not necessary to carry out the output limiting control and the process goes to the step 408. Therefore, at the step 408, as explained above, the determination time period is set at the predetermined value T1.

When, at the step 406, the ECU 17 determines that the brake switch 13 is tuned on, the ECU 17 determines that the output limiting control will be carried out, because a condition for executing the output limiting control is satisfied as a result that the actual acceleration opening degree is larger than the predetermined opening value "cACCTHRESH" and the brake pedal is stepped on. The process goes to a step 407, at which the determination time period is set at the predetermined period limiting value T2. The period limiting value T2 is set at such a value smaller than the predetermined value T1.

The process further goes to a step 409, at which the ECU 17 determines whether the estimated output value for the malfunction diagnosis is larger than the malfunction determining threshold. When the estimated output value for the malfunction diagnosis is determined at the step 409 as being larger than the malfunction determining threshold, that is, when Yes at the step 409, the process goes to a step 410. At the step 410, the ECU determines whether the continuous time (during which the condition that the estimated output value for the malfunction diagnosis is larger than the malfunction determining threshold is continued) exceeds the determination time period (T1 or T2).

When the continuous time is longer than the determination time period, that is, when Yes at the step 410, the process goes to a step 411. In this situation, since the ECU 17 determines that there is a malfunction in the control system for the driving source 11, a flag for the malfunction is turned on (set to an "ON" condition). As a result, the warning is made to the vehicle driver by the warning lamp or the warning display portion. In addition, the proper transaction for the fail safe is carried out.

On the other hand, when the ECU 17 determines that the estimated output value for the malfunction diagnosis is smaller than the malfunction determining threshold (No at the step 409) or when the continuous time is shorter than the determination time period (No at the step 410), the process goes to a step 412. Since the ECU 17 determines, in this situation, that there is no malfunction in the control system for the driving source 11, the flag for the malfunction is turned off (set to an "OFF" condition).

Figure 11:
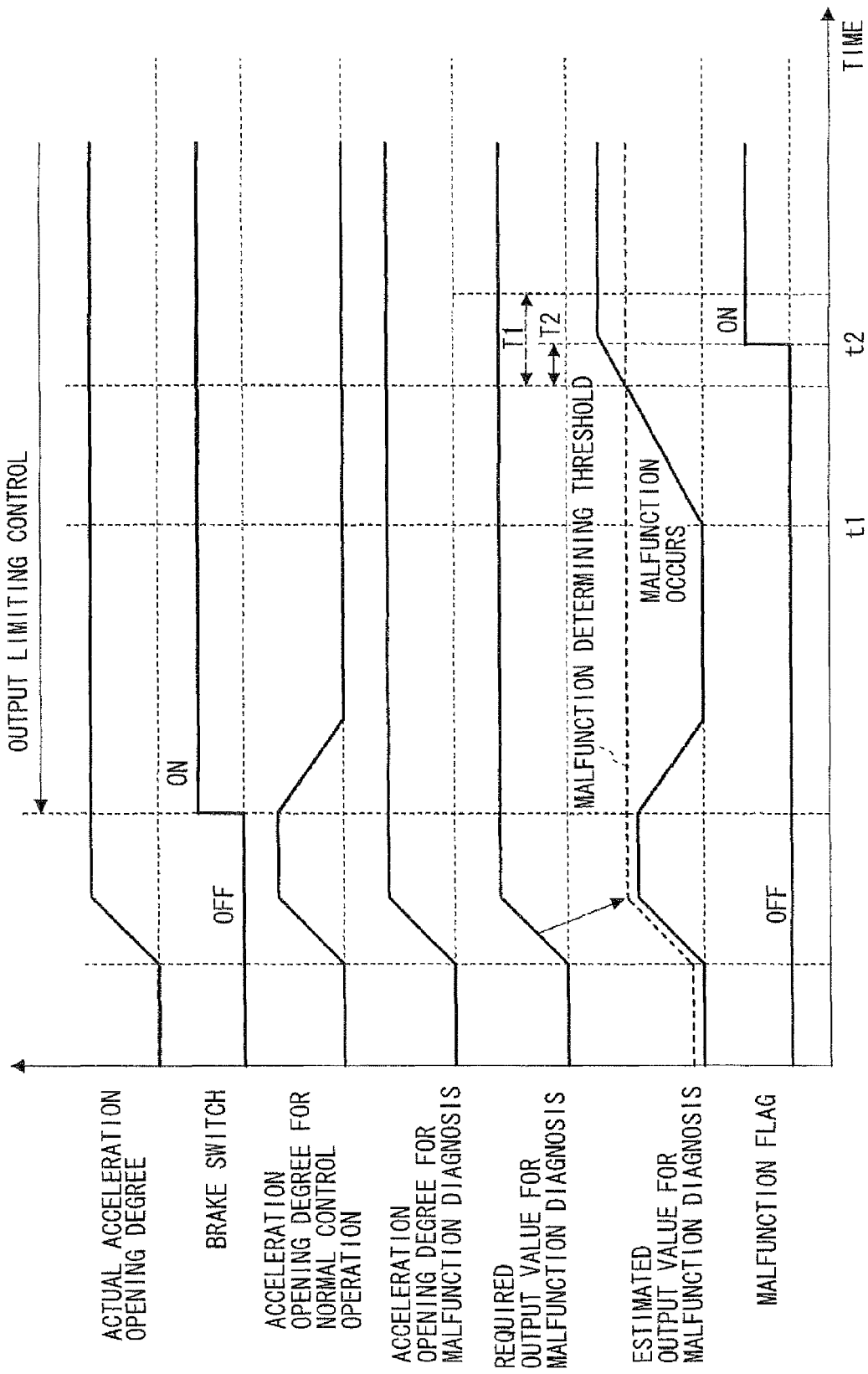
FIG. 11 is a time chart showing execution of malfunction diagnosis according to the third embodiment of the present invention.

According to the malfunction diagnosis of the above explained third embodiment, as shown in FIG. 11, the ECU sets the actual acceleration opening degree detected by the acceleration sensor 12 as the acceleration opening degree for the malfunction diagnosis, and calculates the required output value for the malfunction diagnosis based on such acceleration opening degree for the malfunction diagnosis. The ECU further calculates the malfunction determination threshold based on the required output value for the malfunction diagnosis and compares the malfunction determination threshold with the estimated output value of the driving source 11. When the estimated output value exceeds the malfunction determination threshold, the ECU determines that there is the malfunction in the control system for the driving source 11 when the continuous time (the estimated output value >the malfunction determination threshold) is longer than the determination time period.

In the normal operating condition, the determination time period is set at the predetermined value T1. On the other hand, when the ECU determines, based on the detection signals from the acceleration sensor 12 and the brake switch 13, that both of the acceleration pedal and the brake pedal are stepped on by the vehicle driver, the determination time period is changed to the predetermined period limiting value T2, which is shorter than the predetermined value T1.

As above, when the ECU determines that both of the acceleration pedal and the brake pedal are stepped on, namely when the output limiting control is carried out for limiting the output of the driving source 11, the determination time period is changed to the predetermined period limiting value. Namely, the determination time period is made shorter. As a result, it is possible to make the time period from the timing t1 to the timing t2 shorter. The timing t1 is a timing, at which the malfunction occurs, while the timing t2 is a timing, at which the continuous time (the estimated output value> the malfunction determination threshold) exceeds the determination time period and the ECU finally determines that the malfunction has occurred. It is, therefore, possible to detect the malfunction in the earlier stage and to carry out the transaction for the fail safe earlier.

According to the above first to third embodiments, the acceleration opening degree for the control operation is set at the predetermined acceleration limiting value, when the output limiting control is carried out for limiting the output of the driving source 11. The invention should not be limited to such embodiments. For example, the target output may be set at a predetermined limiting value in order to limit the output of the driving source 11. Alternatively, the control command value to the driving source 11 (that is, the command value to be outputted to the output adjusting device 18) may be set at a predetermined limiting value so as to limit the output of the driving source 11.

In addition, according to the above first to third embodiments, the estimated output value of the driving source 11 and the malfunction determining threshold are compared with each other for the purpose of carrying out the malfunction diagnosis of the control system for the driving source 11. However, the control command value to the driving source 11 (that is, the command value to be outputted to the output adjusting device 18) may be compared with the malfunction determining threshold so as to carry out the malfunction diagnosis of the control system for the driving source 11.

Furthermore, multiple brake switches may be provided in any one of the above first to third embodiments. When the multiple brake switches are provided, the ECU may determine that the brake operation is carried out when one of the multiple brake switches is turned on. In a similar manner, multiple acceleration sensors may be provided.

What is claimed is:

1. A malfunction diagnosing apparatus for a vehicle, which has at least one of an internal combustion engine and an electric motor as a driving source for the vehicle, comprising:
   an acceleration detecting device for detecting an operational condition of an acceleration pedal;
   a brake detecting device for detecting an operational condition of a brake pedal;
   an acceleration opening degree setting device for setting an acceleration opening degree for a normal control operation based on an operational amount of the acceleration pedal detected by the acceleration detecting device;
   an output limiting device for carrying out an output limiting control in order to limit an output of the driving source by limiting the acceleration opening degree for the normal control operation, when an operation of the acceleration pedal is detected by the acceleration detecting device and an operation of the brake pedal is detected by the brake detecting device; and
   a malfunction diagnosing device for calculating a required output value for a malfunction diagnosis based on the operational amount detected by the acceleration detecting device, setting a malfunction determining threshold in accordance with the required output value for the malfunction diagnosis, and comparing an estimated output value of the driving source or a control command value outputted from an engine control unit to the driving source with the malfunction determining threshold so as to determine whether there is a malfunction in a control system for the driving source,
   wherein the malfunction diagnosing device limits the required output value for the malfunction diagnosis to a predetermined limiting value which is equal to or close to the acceleration opening degree for the normal control operation that is limited by the output limiting device, when the operation of the acceleration pedal is detected by the acceleration detecting device and the operation of the brake pedal is detected by the brake detecting device.

2. A malfunction diagnosing apparatus for a vehicle, which has at least one of an internal combustion engine and an electric motor as a driving source for the vehicle, comprising:
   an acceleration detecting device for detecting an operational condition of an acceleration pedal;
   a brake detecting device for detecting an operational condition of a brake pedal;
   an output limiting device for carrying out an output limiting control in order to limit an output of the driving source, when an operation of the acceleration pedal is detected by the acceleration detecting device and an operation of the brake pedal is detected by the brake detecting device; and a malfunction diagnosing device for calculating a required output value for a malfunction diagnosis based on an operational amount detected by the acceleration detecting device, setting a malfunction determining threshold in accordance with the required output value for the malfunction diagnosis, and comparing an estimated output value of the driving source or a control command value outputted from an engine control unit to the driving source with the malfunction determining threshold so as to determine whether there is a malfunction in a control system for the driving source, wherein the malfunction diagnosing device changes the malfunction determining threshold in conjunction with the output limiting control carried out by the output limiting device.

3. A malfunction diagnosing apparatus for a vehicle, which has at least one of an internal combustion engine and an electric motor as a driving source for the vehicle, comprising:

an acceleration detecting device for detecting an operational condition of an acceleration pedal;

a brake detecting device for detecting an operational condition of a brake pedal;

an output limiting device for carrying out an output limiting control in order to limit an output of the driving source, when an operation of the acceleration pedal is detected by the acceleration detecting device and an operation of the brake pedal is detected by the brake detecting device; and a malfunction diagnosing device for calculating a required output value for a malfunction diagnosis based on an operational amount detected by the acceleration detecting device, setting a malfunction determining threshold in accordance with the required output value for the malfunction diagnosis, and comparing an estimated output value of the driving source or a control command value outputted from an engine control unit to the driving source with the malfunction determining threshold, wherein, when the estimated output value of the driving source or the control command value outputted to the driving source exceeds the malfunction determining threshold, the malfunction diagnosing device determines whether there is a malfunction in a control system for the driving source, depending on a condition whether a continuous time during which the estimated output value or the control command value is larger than the malfunction determining threshold exceeds a determination time period, and wherein the malfunction diagnosing device reduces the determination time period when the output limiting control is carried out by the output limiting device, compared with a case where the output limiting control is not carried out.

4. A malfunction diagnosing apparatus for a vehicle, which has at least one of an internal combustion engine and an electric motor as a driving source for the vehicle, comprising:

an electronic control unit configured to:
receive a signal representing an operational amount of an acceleration pedal;
receive a signal representing an operational amount of a brake pedal;
determine that both the acceleration pedal and the brake pedal are operated at a same time based on the received signals;
set an acceleration opening degree for a normal control operation based on the signal representing the operational amount of the acceleration pedal;
perform an output limiting control in order to limit an output of the driving source by limiting the acceleration opening degree for the normal control operation upon determination that both the acceleration pedal and the brake pedal are operated at the same time;
calculate a required output value for a malfunction diagnosis based on the operational amount of the acceleration pedal;
set a malfunction determining threshold in accordance with the required output value for the malfunction diagnosis;
determine whether there is a malfunction in a control system for the driving source based on the malfunction determining threshold; and
limit the required output value for the malfunction diagnosis to a predetermined limiting value which is equal to or close to the acceleration opening degree for the normal control operation upon determination that both the acceleration pedal and the brake pedal are operated at the same time.

5. A malfunction diagnosing apparatus for a vehicle, which has at least one of an internal combustion engine and an electric motor as a driving source for the vehicle, comprising:

an electronic control unit configured to:
receive a signal representing an operational amount of an acceleration pedal;
receive a signal representing an operational amount of a brake pedal;
determine that both the acceleration pedal and the brake pedal are operated at a same time based on the received signals;
perform an output limiting control in order to limit an output of the driving source upon determination that both the acceleration pedal and the brake pedal are operated at the same time;
calculate a required output value for a malfunction diagnosis based on the signal representing the operational amount of the acceleration pedal;
set a malfunction determining threshold in accordance with the required output value for the malfunction diagnosis;
determine whether there is a malfunction in a control system for the driving source based on the malfunction determining threshold; and
change the malfunction determining threshold in conjunction with the performed output limiting control without a change in the required output value for the malfunction diagnosis.

6. A malfunction diagnosing apparatus for a vehicle, which has at least one of an internal combustion engine and an electric motor as a driving source for the vehicle, comprising:

an electronic control unit configured to:
receive a signal representing an operational amount of an acceleration pedal;
receive a signal representing an operational amount of a brake pedal;

determine that both the acceleration pedal and the brake pedal are operated at a same time based on the received signals;

perform an output limiting control in order to limit an output of the driving source upon determination that both the acceleration pedal and the brake pedal are operated at the same time;

calculate a required output value for a malfunction diagnosis based on an operational amount of the acceleration pedal;

set a malfunction determining threshold in accordance with the required output value for the malfunction diagnosis;

compare an estimated output value of the driving source or a control command value outputted from the electronic control unit to the driving source with the malfunction determining threshold;

when the estimated output value of the driving source or the control command value outputted to the driving source exceeds the malfunction determining threshold, determine that there is a malfunction in a control system for the driving source based on a condition that a continuous time during which the estimated output value or the control command value is larger than the malfunction determining threshold exceeds a determination time period; and reduce the determination time period when the output limiting control is carried out as compared with a case where the output limiting control is not carried out so that the malfunction can be determined without a change in the malfunction determining threshold.

* * * * *